G. E. CROWELL.
HARROW.
APPLICATION FILED DEC. 5, 1911.

1,058,415.

Patented Apr. 8, 1913.

Giles E. Crowell,
Inventor

Witnesses by C. A. Snow & Co.
Attorneys

COLUMBIA PLANOGRAPH CO., WASHINGTON, D. C.

UNITED STATES PATENT OFFICE.

GILES EDWARD CROWELL, OF CONCORD, NORTH CAROLINA.

HARROW.

1,058,415.  Specification of Letters Patent.  Patented Apr. 8, 1913.

Application filed December 5, 1911. Serial No. 664,023.

*To all whom it may concern:*

Be it known that I, GILES E. CROWELL, a citizen of the United States, residing at Concord, in the county of Cabarrus and State of North Carolina, have invented a new and useful Harrow, of which the following is a specification.

This invention relates to side harrows and its object is to provide a device of this character having improved means for adjustably connecting the harrow teeth to the beam whereby the soil can be thrown toward or away from the row.

Another object is to provide a device of this type which is cheap to manufacture and easy to manipulate.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
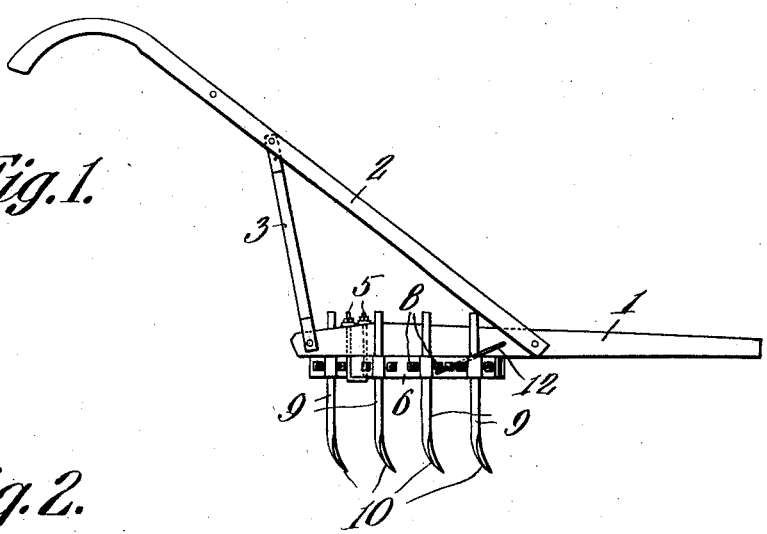
Figure 2:
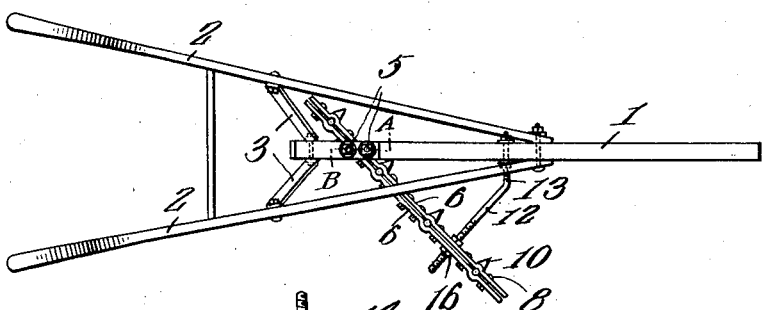
Figure 3:
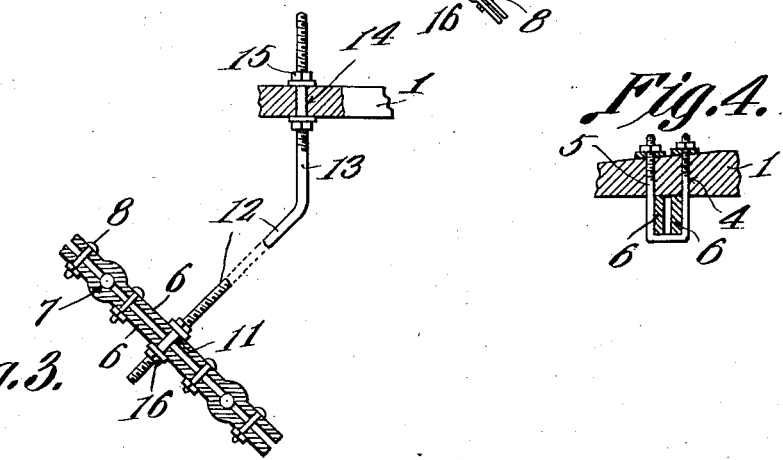
Figure 4:
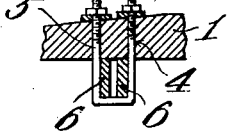

In said drawings:—Figure 1 is a side elevation of the harrow. Fig. 2 is a plan view thereof. Fig. 3 is a horizontal section through a portion of the tooth carrying bar and showing its brace. Fig. 4 is an enlarged section on the line A—B Fig. 2.

Referring to the figures by characters of reference 1 designates a beam having upwardly and rearwardly diverging handles 2 bolted to opposite sides of the beam and provided with braces 3 which extend downwardly and are bolted to opposite sides of the rear end portion of the beam 1. Parallel openings 4 are formed within the rear portion of the beam and receive a U-bolt 5 embracing parallel strips 6 which extend under the beam at any desired angle relative thereto. Each of the strips is preferably formed with transversely extending grooves 7 in its inner face, the grooves in each strip registering with the corresponding grooves in the opposed strip. Bolts 8 extend through the strips 6 close to the sides of the grooves 7. Said grooves are adapted to receive the cylindrical stems 9 of spoon-shaped harrow teeth 10 which are inclined forwardly, as shown particularly in Fig. 1, and it will be apparent that, by tightening the bolts 8, the grooved portions of the strips 6 will bind tightly onto stems 9 and thereby hold said stems against movement relative to the strips 6. Furthermore said stems can be rotated so as to bring the teeth 10 in any desired positions relative to the strips and, as two bolts are provided adjacent opposite portions of each stem 9, it will be apparent that the strips 6 can thus be firmly clamped upon and securely held relative to the stems.

Registering openings 11 are formed in the strips 6 near one end and are adapted to receive the threaded end portion of a brace rod 12. This rod has an extension 13 projecting at an angle thereto and adapted to extend through an opening 14 extending transversely through the beam 1. Nuts 15 are mounted on the extension 13 and engage opposite faces of the beam 1 so as to hold said extension against movement relative to the beam and additional nuts 16 are mounted on the rod 12 and engage the respective strips 6 so as to hold said rod against movement relative to the strips.

In assembling the parts of the harrow, the bolts 8 are loosened and the stems 9 of teeth 10 are inserted into the registering recesses or grooves 7. Said stems are then rotated so as to bring the teeth 10 at desired distances from the strips 6 and at predetermined angles thereto, after which the bolts 8 are tightened so as to clamp the two strips 6 tightly on the stems 9 and thus hold the stems against rotation and also against longitudinal movement. The strips 6 are then placed under the beam 1 and the U-bolt 4 is brought into engagement with the strips and inserted into the beam 1 and fastened, this bolt serving to bind the strips upon the lower face of the beam. This U-bolt is preferably placed in engagement with the strips 6 at points between the two teeth at one end of the strips. Rod 12 is then inserted through the openings 11 and fastened thereto by means of the nuts 16. By adjusting the nuts on the rod the strips 6 can be held at any desired angle relative to the beam 1. Obviously, if desired, the strips 6 can be extended obliquely from the opposite side of the beam 1 by placing the rod 12 at the other side of the beam, reversing the strips 6 so that they will be extended forwardly from the opposite side of the beam, and then reattaching the rod 12 to the strips 6. The teeth can then be properly adjusted between the strips 6 whereupon they can be used to throw the soil in the proper direction.

It will be apparent that when the harrow is drawn forward, the soil can be thrown either to the right or to the left as desired, this being dependent upon the relative positions of the parts of the harrow.

What is claimed is:—

A harrow including a beam having a transverse opening therein, a tooth carrying structure extending under the beam and adjustable longitudinally and angularly relative thereto, a clamping means straddling and extending under said structure and secured to the beam for holding the structure against longitudinal movement, an angular brace having one end portion screw threaded and extended through the transverse opening in the beam and its other end portion screw threaded and extended transversely through the tooth carrying structure, said brace being reversible to extend beyond either side of the beam, and means engaging the brace for clamping upon opposite sides of the tooth carrying structure to hold said structure fixed relative to the brace.

In testimony that I claim the foregoing as my own, I have hereto affixed my signature in the presence of two witnesses.

GILES EDWARD CROWELL.

Witnesses:
CHARLES JAY HARRIS,
JOHN B. MCALLISTER.